US008184575B2

(12) United States Patent
Miyagi et al.

(10) Patent No.: US 8,184,575 B2
(45) Date of Patent: May 22, 2012

(54) PACKET COMMUNICATION NETWORK AND SUBSCRIBER-ASSOCIATED-INFORMATION DELIVERY CONTROLLER

(75) Inventors: Morihito Miyagi, Hayama (JP); Nobuko Miyagi, legal representative, Hayama (JP); Koji Watanabe, Kawasaki (JP); Hitomi Nakamura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 764 days.

(21) Appl. No.: 12/247,494

(22) Filed: Oct. 8, 2008

(65) Prior Publication Data

US 2009/0141671 A1    Jun. 4, 2009

(30) Foreign Application Priority Data

Nov. 29, 2007  (JP) ................................. 2007-308862

(51) Int. Cl.
*H04W 4/00* (2009.01)
(52) U.S. Cl. ....................................................... 370/328
(58) Field of Classification Search .................. 370/328
See application file for complete search history.

(56) References Cited

U.S. PATENT DOCUMENTS

| | | | | |
|---|---|---|---|---|
| 7,133,667 | B2* | 11/2006 | Suzuki et al. .................. | 455/423 |
| 2004/0162058 | A1* | 8/2004 | Mottes ........................... | 455/411 |
| 2005/0074014 | A1 | 4/2005 | Rao et al. | |
| 2005/0190772 | A1 | 9/2005 | Tsai et al. | |
| 2006/0080059 | A1* | 4/2006 | Stupp et al. ................... | 702/120 |
| 2007/0133565 | A1* | 6/2007 | Hyun et al. .............. | 370/395.52 |
| 2007/0203880 | A1* | 8/2007 | Kumar et al. ...................... | 707/1 |
| 2007/0245007 | A1* | 10/2007 | Tsirtsis et al. ................. | 709/223 |
| 2008/0139112 | A1* | 6/2008 | Sampath et al. ............... | 455/3.04 |
| 2008/0254833 | A1* | 10/2008 | Keevill et al. ................ | 455/558 |
| 2009/0061863 | A1* | 3/2009 | Huggett et al. ............... | 455/434 |
| 2009/0286531 | A1* | 11/2009 | Bhatt et al. ................. | 455/426.1 |
| 2010/0189019 | A1* | 7/2010 | Belfort et al. ................. | 370/310 |
| 2011/0098075 | A1* | 4/2011 | Bienas et al. ................. | 455/517 |

FOREIGN PATENT DOCUMENTS

| | | |
|---|---|---|
| JP | 2006-260331 | 9/2006 |
| JP | 2006-340267 | 12/2006 |
| WO | WO 03/036915 | 5/2003 |

OTHER PUBLICATIONS

Telecommunication 2005, vol. 22, No. 6, published on May 25, 2005, pp. 110-113 and partial translation thereof.
Report by the Study Group on mobile Business,—For Realization of Open Mobile Business Enviroment—Sep. 2007.

* cited by examiner

*Primary Examiner* — Jeffrey Pwu
*Assistant Examiner* — Faisal Choudhury
(74) *Attorney, Agent, or Firm* — Antonelli, Terry, Stout & Kraus, LLP.

(57) ABSTRACT

In a packet communication network comprising an MNO network, and an MVNO network including an application server for providing an information service to wireless terminals via the MNO network, the MNO network includes a subscriber-associated-information delivery controller for delivering subscriber associated information of each wireless terminal, which is connected to a radio access network, to the MVNO network, and the MVNO network includes a subscriber-associated-information processor for receiving the subscriber associated information delivered from the subscriber-associated-information delivery controller.

10 Claims, 7 Drawing Sheets

FIG. 3

LAID-OPEN INFORMATION MANAGEMENT TABLE 510

| USER ID | LIST OF DESTINATION GW | SOURCE ADDRESS PUBLICATION FLAG | LOCATION INFORMATION PUBLICATION FLAG | STATISTICS INFORMATION PUBLICATION FLAG | USER ID FOR MVNO | |
|---|---|---|---|---|---|---|
| af170001 | GWd | 0 | 1 | 0 | 0 | EN1 |
| af170002 | GWb, GWc | 1 | 0 | 1 | 0 | EN2 |
| af170003 | GWa | 0 | 0 | 1 | 1001050 | EN3 |
| af170004 | GWb, GWc | 1 | 0 | 1 | 0 | EN4 |
| ⋮ | ⋮ | ⋮ | ⋮ | ⋮ | ⋮ | |

CONTROL CHANNEL INFORMATION MANAGEMENT TABLE 520

| DESTINATION GW IDENTIFIER | GW IP ADDRESS | SESSION ID | |
|---|---|---|---|
| GWa | xx. yy. mm. nn | 65520 | EN01 |
| GWb | xx. yy. pp. qq | 65521 | EN02 |
| GWc | xx. yy. gg. hh | 65522 | EN03 |
| GWd | xx. yy. ss. tt | 65523 | EN04 |
| ⋮ | ⋮ | ⋮ | |

521, 522, 523

US 8,184,575 B2

PACKET COMMUNICATION NETWORK AND SUBSCRIBER-ASSOCIATED-INFORMATION DELIVERY CONTROLLER

CLAIM OF PRIORITY

The present application claims priority from Japanese patent application JP 2007-308862, filed on Nov. 29, 2007, the content of which is hereby incorporated by reference into this application.

BACKGROUND OF THE INVENTION (1) Field of the Invention

The present invention relates to a packet communication network and a subscriber-associated-information delivery controller, and more specifically, to a packet communication network comprising a mobile network operator (MNO) network, which includes a radio access network, and a mobile virtual network operator (MVNO) network, which provides an information service network to each wireless terminal by using communication resource of the MNO network, and a subscriber-associated-information delivery controller located in the MNO network.

(2) Description of Related Art

In the Internet (IP network), there exist free application sites for providing information services without charge and pay application sites for providing information services with charge. The free application site provides an information service in response to a request from each user without authenticating the user. On the other hand, the pay application site determines whether a requesting user is a user having been registered as a subscriber, and provides an information service in response to the request only to a user authenticated as the member.

The Internet is seeing a rapid increase in the number of accesses from wireless terminals, such as, a personal computer equipped with a communication card and a cellular phone, in addition to wired terminals using subscriber lines. A small-sized, lightweight portable wireless terminal is improving in information processing capacity and data transmission speed. Consequently, application services aimed at wireless terminal users are promising in the Internet.

In order to expand an application service market for such wireless terminals, the Ministry of Internal Affairs and Communications is promoting the communication services by a mobile virtual network operator (MVNO), as is shown, for example, by a mobile business study group report in 2007. The MVNO means a carrier that provides information communication services to end users without being assigned a dedicated frequency for the MVNO, by using communication resources and communication services provided by an existing mobile network operator (MNO) who undertakes the business of Type I telecommunications carriers.

Since the MVNO provides unique communication services to end users by borrowing a part of communication resources of the MNO, it will subject to constraints about the operation of the communication resources. Then, for example, Japanese unexamined patent publication No. 2006-340267 has proposed a wireless communication service system that enables the MVNO to provide a unique call processing service independent from a call processing service by the MNO and to decide connection fees, by installing a call processing function named a call agent connected to a wireless exchange office of the MNO.

SUMMARY OF THE INVENTION

Each application site connected to the Internet (IP network) has to collect and analyze information on each Internet user, in order to develop information services directed toward needs of the users. The subscriber associated information that the application site can use includes, for example, personal information presented when each user did membership registration, information on a terminal of each user (terminal information), statistics information for each user. The user's personal information includes information items such as age, sex, occupation of each user, for example. The terminal information includes, for example, a network address of each terminal. The statistics information includes information items such as an access frequency, access time zone, and accessed contents for each user.

However, since the MVNO is providing the information service to the wireless terminal by borrowing a communication resource of the MNO network, without having its own access network in the wireless communication area, the subscriber associated information collectable by its own site is limited to information on users who actually accessed the MVNO's application server. That is, since the MVNO can receive only transmission packets from user terminals having accessed the application server of its own site via the MNO network even though a large number of user terminals (wireless terminals) are connected to the access network of the MNO network, the MVNO cannot know the current states of many other unspecified user terminals being connected to the access network.

An object of the present invention is to provide a network configuration capable of collecting the subscriber associated information effective for the MVNO network in a packet communication network comprising the MNO network and the MVNO network.

Another object of the present invention is to provide a subscriber-associated-information delivery controller capable of collecting subscriber associated information required by the MVNO and delivering it to the MVNO.

In order to attain the aforementioned objects, a packet communication network according to the present invention comprises a mobile network operator (MNO) network, which includes a radio access network for communicating with wireless terminals, and a mobile virtual network operator (MVNO) network including an application server for providing information services to the wireless terminals via the MNO network. The MNO network includes a subscriber-associated-information delivery controller for collecting subscriber associated information of each wireless terminal connected to the radio access network and delivering the collected subscriber associated information to the MVNO network. The MVNO network includes a subscriber-associated-information processor for receiving the subscriber associated information delivered from the subscriber-associated-information delivery controller.

In more detail, in the packet communication network of the present invention, the MNO network includes a gateway apparatus for connecting the access network to a core network, and a mobile controller. At least one of the gateway apparatus and the mobile controller transmits, in response to a predetermined event occurred in a communication sequence performed with one of the wireless terminals, an event notification message including subscriber associated information of the wireless terminal to the subscriber-associated-information delivery controller. The subscriber-associated-information delivery controller selectively delivers the subscriber associated information indicated in the event notification message to the subscriber-associated-information processor of the MVNO network.

In one embodiment of the present invention, the MNO network includes a management server for managing statistics information for each user of the wireless terminals, and the subscriber-associated-information delivery controller obtains when processing the event notification message indicating session close, statistics information corresponding to a user identifier indicated in the event notification message from the management server and delivers the statistics information to the subscriber-associated-information processor of the MVNO network as the subscriber associated information.

The subscriber-associated-information delivery controller of the present invention belongs to a MNO network, which includes a radio access network for communicating with wireless terminals, a gateway apparatus for connecting the radio access network to a core network, and a mobile controller, and delivers subscriber associated information of each wireless terminal to a plurality of MVNO networks each providing information services to the wireless terminals via the MNO network.

The subscriber-associated-information delivery controller comprises: an internal network interface for receiving event notification messages each including subscriber associated information of one of the wireless terminals from at least one of the gateway apparatus and the mobile controller; an external network interface for connecting with the core network; a controller; and a laid-open information management table for indicating the correspondence between an identifier of a subscriber-associated-information processor belonging to each of the MVNO networks and the kind of the subscriber associated information to be delivered. The controller selectively delivers the subscriber associated information indicated in the event notification message received through the internal network interface to the subscriber-associated-information processor of the MVNO network in accordance with the laid-open information management table.

The subscriber-associated-information delivery controller of the present invention is equipped with, for example, a channel information management table for indicating the correspondence between an identifier of the subscriber-associated-information processor and a session identifier. In this case, the controller delivers the subscriber associated information to the subscriber-associated-information processor through a control channel which is formed on the core network through the network interface and assigned the session identifier.

In one embodiment of the present invention, the laid-open information management table comprises a plurality of table entries each of which indicates in association with an user identifier of each of the wireless terminals, for example, the identifier of the subscriber-associated-information processor to be the delivery destination of the subscriber associated information and the kind of the subscriber associated information to be delivered, the internal network interface receives an event notification message including an user identifier and the subscriber associated information from the gateway apparatus or the mobile controller, and the controller searches the laid-open information management table for a table entry corresponding to the user identifier indicated in the event notification message and selectively delivers the subscriber associated information indicated in the event notification message to the subscriber-associated-information processor of the MVNO network according to the table entry.

According to the present invention, each MVNO can use the subscriber associated information received by the subscriber-associated-information processor for the purpose of improvement of information services and development of a new information service. By using the subscriber associated information, the MVNO becomes possible to control the information services to the wireless terminals by the application server.

BRIEF DESCRIPTION OF DRAWINGS

FIG. 3 is a diagram showing an embodiment of a laid-open information management table 510 to be prepared in the subscriber-associated-information delivery controller 50;

FIG. 4 is a diagram showing an embodiment of a control channel information management table 520 to be prepared in the subscriber-associated-information delivery controller 50;

DETAILED DESCRIPTION OF PREFERRED EMBODIMENTS

Hereafter, embodiments of the present invention will be described with reference to the drawings.

Figure 1:
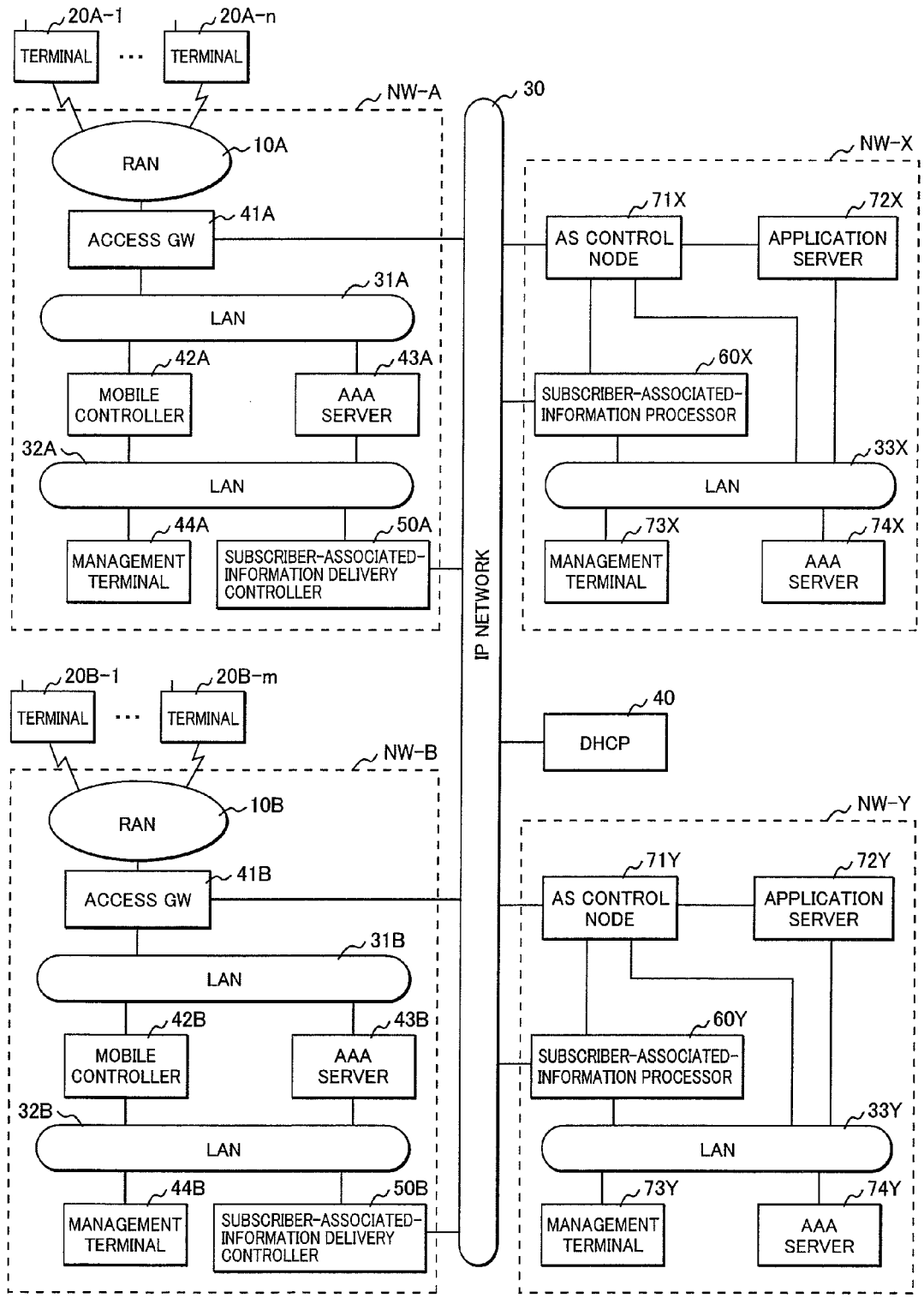
FIG. 1 is a diagram showing an example of a network configuration to which the present invention is applied.

FIG. 1 shows an example of a network configuration to which the present invention is applied. In FIG. 1, a symbol denotes an IP network as a core network, a symbol NW-A denotes a first MNO network connected to the IP network 30, a symbol NW-B denotes a second MNO network connected to the IP network 30, a symbol NW-X denotes a first MVNO network connected to the IP network 30, a symbol NW-Y denotes a second MVNO network connected to the IP network 30, a symbol 20A (20A-1 to 20A-n) denotes a wireless terminal connected to the IP network 30 through the first MNO network NW-A, a symbol 20B (20B-1 to 20B-m) denotes a wireless terminal connected to the IP network 30 through the second MNO network NW-B, and a symbol 40 denotes a DHCP server connected to the IP network 30.

The first MNO network NW-A includes a radio access network (RAN) 10A, an access gateway (GW) 41A for connecting the RAN 10A and the IP network 30, a mobile controller 42A and an AAA (Authentication, Authorization, and Accounting) server 43A that are connected to the access GW 41A through a first local area network (LAN) 31A, a management terminal 44A connected to the mobile controller 42A and the AAA server 43A through a second LAN 32A, and a subscriber-associated-information delivery controller 50A as a characteristic element of the present invention, which is connected to the second LAN 32A and the IP network 30. The subscriber-associated-information delivery controller 50A can be constructed, for example, by a gateway with the function of connecting between the networks.

The RAN 10A includes a plurality of wireless base stations connected to the access GW 41A. Each of wireless terminal 20A is connected to the IP network 30 through any one of the wireless base stations and the access GW 41A.

Upon receiving a control message such as a location registration request, a session connection request, and a session disconnection request from the wireless terminal 20A, the access GW 41A forwards the received message to the mobile controller 42A or the AAA server 43A in accordance with the control sequence, and performs a relaying operation of user packets to be communicated between the wireless terminal 20A and the IP network. According to the present invention, as will be described in detail later, when a predetermined event occurs in communication between the wireless terminal 20A and the MNO network NW-A, an event notification message including subscriber associated information depending on the event is issued from the access GW 41A or the mobile controller 42A to the subscriber-associated-information delivery controller 50A so that the subscriber-associated-information delivery controller 50A can collect the subscriber associated information on the wireless terminal 20A.

Like the network NW-A, the second MNO network NW-B also includes an RAN 10B, an access GW 41B for connecting the RAN 10B and the IP network 30, a mobile controller 42B and an AAA server 43B connected to the access GW 41B through a first LAN 31B, and a management terminal 44B and a subscriber-associated-information delivery controller 50B that are connected to the mobile controller 42B and the AAA server 43B through a second LAN 32B.

Incidentally, the first LAN 31 (31A, 31B) and the second LAN 32 (32A, 32B) may be unified into a single LAN in each MNO network, so that the access GW 41, the mobile controller 42, the AAA server 43, the management terminal 44, and the subscriber-associated-information delivery controller 50 are interconnected by the single LAN.

On the other hand, the first MVNO network NW-X includes an application server (AS) control node 71X connected to the IP network 30, an application server (AS) 72X connected to the AS control node 71X, a management terminal 73X and an AAA server 74X that are connected to the AS control node 71X and the application server 72X through a LAN 33X, and a subscriber-associated-information processor 60X as a characteristic element of the present invention, which is connected to the IP network 30, the AS control node 71X, and the LAN 33X. The subscriber-associated-information processor 60X can be constructed, for example, by a gateway with the function of connecting between the networks.

Like the network NW-X, the second MVNO network NW-Y also includes an AS control node 71Y connected to the IP network 30, an application server (AS) 72Y connected to the AS control node 71Y, a management terminal 73Y and an AAA server 74Y that are connected to the AS control node 71Y and the application server 72Y through a LAN 33Y, and a subscriber-associated-information processor 60Y connected to the IP network 30, the AS control node 71Y, and the LAN 33Y. Incidentally, the functions of the AAA servers 74X and 74Y may be executed by the AAA server 43A or 43B in the MNO network, depending on the application form of the MVNO network.

Although FIG. 1 shows a network configuration including two MNO networks and two MVNO networks, delivery control of the subscriber associated information according to the present invention does not give special limitation on the number of the MNO networks to be the transmission sources of the subscriber associated information and the number of the MNO networks to be the delivery destinations of the subscriber associated information. In other words, the subscriber associated information can be delivered from one MNO network to an arbitrary number of MVNO networks, and each MVNO network can receive the subscriber associated information from an arbitrary number of MNO networks.

Figure 2:
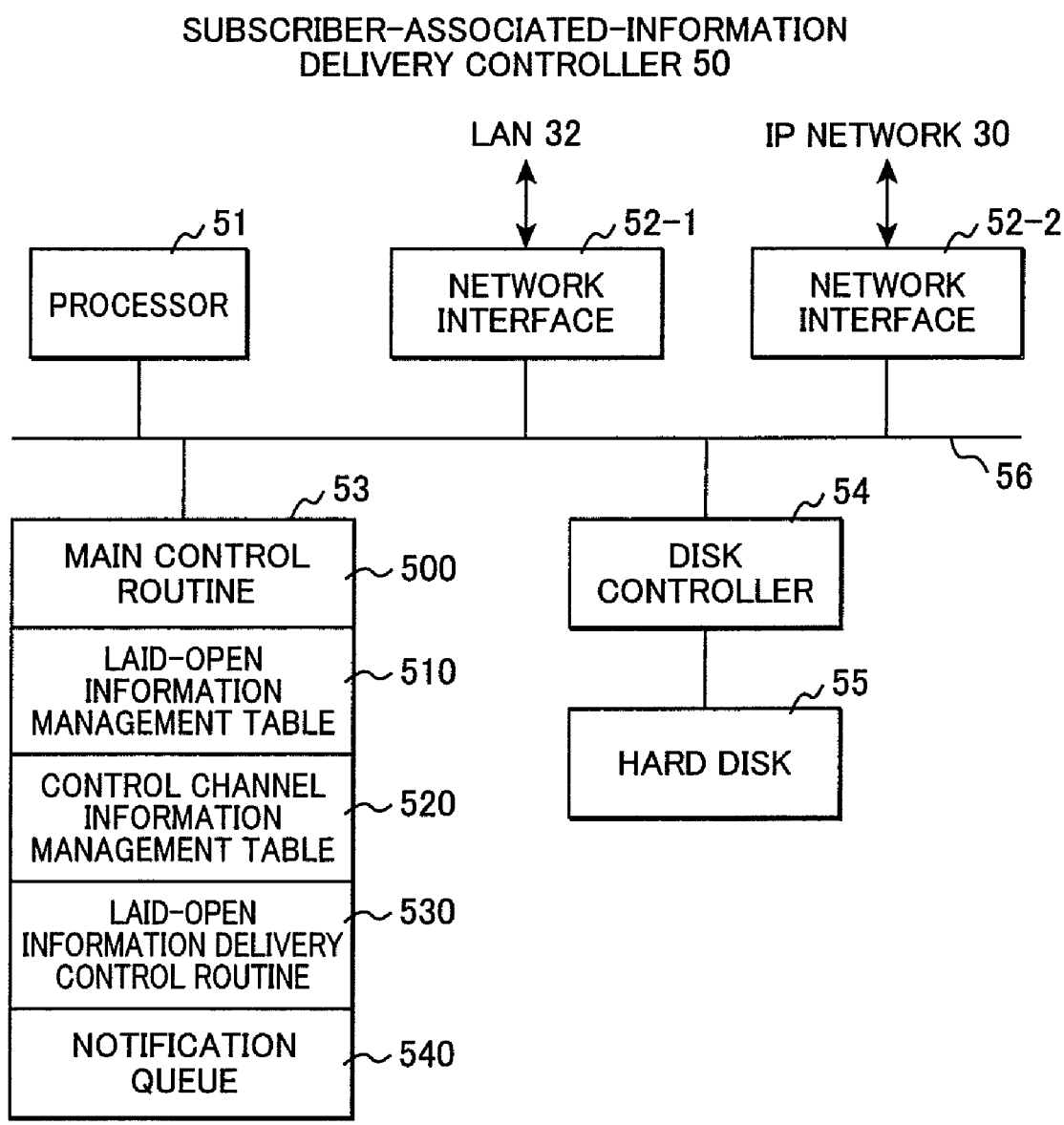
FIG. 2 is a block configuration diagram showing an embodiment of a subscriber-associated-information delivery controller 50 (50A, 50B) shown in FIG. 1.

FIG. 2 is a block configuration diagram showing an embodiment of the subscriber-associated-information delivery controller 50 (50A, 50B in FIG. 1) located in the MNO network. The subscriber-associated-information delivery controller 50 comprises a processor 51, an internal network interface 52-1 to be connected to the second LAN 32, an external network interface 52-2 to be connected to the IP network 30, a main memory 53, a disk controller 54, and external memory (hard disk) 55 controlled by the disk controller 54. These elements 52 to 54 are connected to the processor 51 through an internal bus 56.

In the main memory 53, a main control routine 500, a laid-open information management table 510, a control channel information management table 520, and a laid-open information delivery control routine 530 are prepared as software related to the present invention. These pieces of software are loaded from the external memory 55 to the main memory 53 at the time of starting the subscriber-associated-information delivery controller 50.

Upon receiving an event notification message from the access GW 41 or the mobile controller 42, the main control routine 500 stores the received message in a notification queue 540 defined on the main memory 53. The event notification messages stored in the notification queue 540 are processed by the laid-open information delivery control routine 530 that is cyclically started in a fixed period. Details of the laid-open information delivery control routine 530 will be explained later with reference to FIG. 10.

FIG. 3 shows an example of the laid-open information management table 510. In this embodiment, the laid-open information management table 510 comprises a plurality of table entries (EN1, EN2, ... ), each having a user ID 511. Each of table entries indicates, in association with the user ID 511, a list of destination GW 512 for specifying delivery destinations of the subscriber associated information, plural kinds of publication flags 513 (513A, 513B, ... ), and a user ID 514 for MVNO.

In the list of destination GW 512, at least one identifier (GW identifier) of a subscriber-associated-information processor 60 belonging to the MVNO having reserved delivery of the subscriber associated information which is specified by the user ID 511 is registered. In the case where delivery of the same subscriber associated information has been reserved by a plurality of MVNOs, identifiers of a plurality of subscriber-associated-information processors will be registered in the list of destination GW 512.

In the laid-open information management table 510 of this embodiment, there are prepared as the publication flags 513, a source address publication flag 513A indicating whether the wireless terminal IP address is allowed to be laid open or not, a location information publication flag 513B indicating whether the location information of the wireless terminal is allowed to be laid open or not, and a statistics information publication flag 513C indicating whether the user statistics information of the wireless terminal is allowed to be laid open or not. The subscriber associated information for which "1" is set as a value of the publication flag means that this information is allowed to be published. The subscriber associated information for which "0" is set as a value of the publication flag means that publication is inhibited.

The user ID 514 for MVNO is used in the case where the MVNO network is managing the user ID in a special ID system different from the user ID 511. In FIG. 3, the user ID 514 of a table entry EN3 indicates a user ID to be used in the MVNO network to which the subscriber-associated-information processor having an identifier GWa belongs. To the subscriber-associated-information processor having the identifier GWa, the subscriber associated information is notified by applying the user ID 514 instead of the user ID 511. In the case where a plurality of MVNO networks, each of which is managing the user IDs in the specific ID system of its own, wish delivery of the same subscriber associated information, a plurality of different user IDs 514 corresponding to these MVNOs are stored in the laid-open information management table 510.

FIG. 4 shows an example of the control channel information management table 520. The control channel information management table 520 comprises a plurality of table entries EN01, EN02, . . . , each of which indicates the correspondence among a destination GW identifier 521, a GW IP address 522, and a session ID 523.

As the destination GW identifier 521, a GW identifier having been registered as the list of destination GW 512 in the laid-open information management table 510 is stored. The subscriber-associated-information delivery controller 50 can specify the GW IP address 522 and the session ID 523 of the destination MVNO from the control channel information management table 520, by using the destination GW identifier indicated by the list of destination GW 512 in the laid-open information management table 510 as a search key when delivering the subscriber associated information having a certain user ID to the MVNO.

Addition of a new table entry and update of the contents of the table entries in the laid-open information management table 510 and the control channel information management table 520 are performed by a system manager of the MNO from the management terminal 44. The system manager of the MNO registers, in the control channel information management table 520, the GW identifier 521 and the IP address 522 indicating the subscriber-associated-information processor of the MVNO to be the destination of laid-open information, and establishes a secure control channel having the session ID 523 between the subscriber-associated-information delivery controller 50 and the subscriber-associated-information processor 60 on the MVNO side.

The control channel can be established with a transport layer by a known method. A communication protocol for the control channel may be determined according to the security level having been decided between the MNO and the MVNO. For example, in the case where the MNO side desires a security level capable of checking the existence of falsification on the received message and validity of a sender and an author of the message, a TLS (Transport Layer Security) protocol stipulated by RFC2246 may be used.

Figures 5, 6:
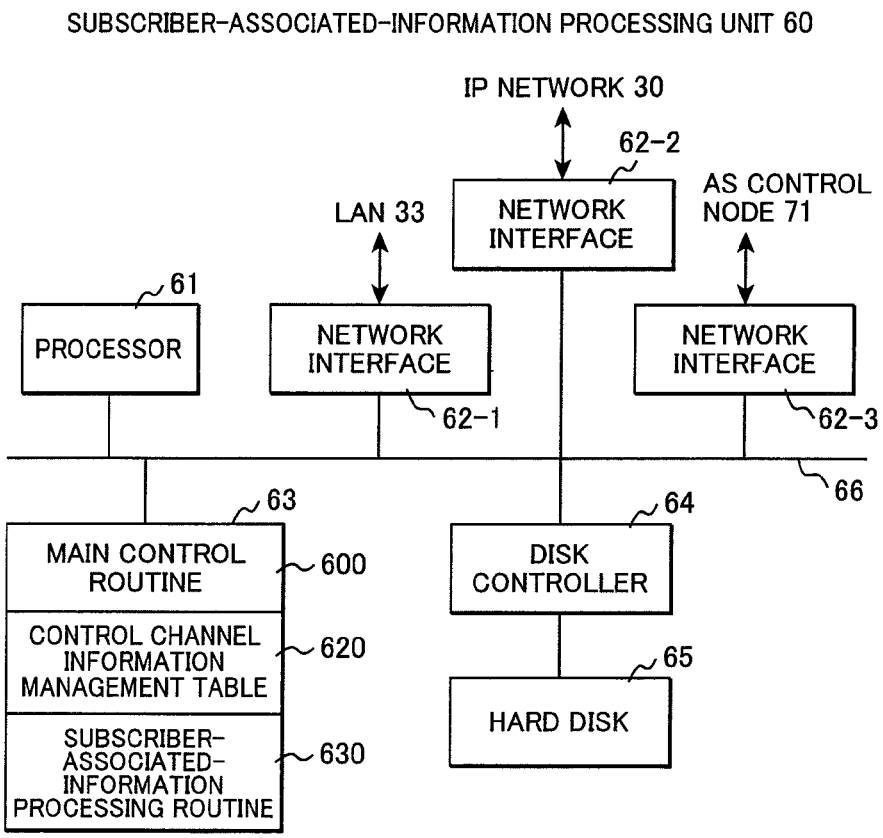
FIG. 5 is a block configuration diagram showing an embodiment of a subscriber-associated-information processor 60 (60X, 60Y) shown in FIG. 1.
FIG. 6 is a diagram showing an example of a control channel information management table 620 to be prepared in the subscriber-associated-information processor 60.
Figure 7:
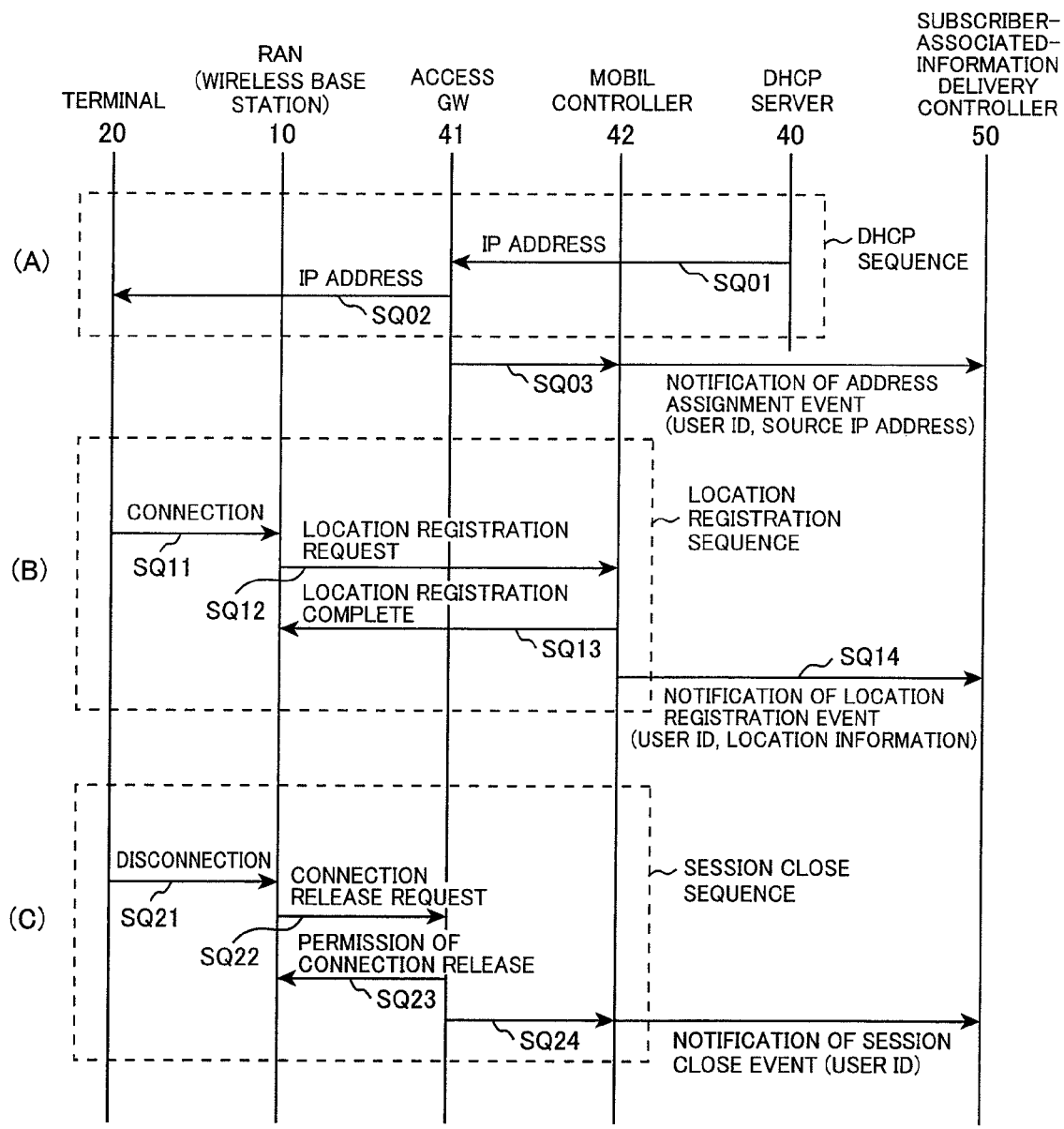
FIG. 7 is a sequence diagram for explaining the trigger of generating an event notification message to be transmitted to the subscriber-associated-information processor 60.

FIG. 5 is a block configuration diagram showing an embodiment of the subscriber-associated-information processor 60 (60X, 60Y in FIG. 1) being located in the MVNO network.

The subscriber-associated-information processor 60 comprises a processor 61, an internal network interface 62-1 for connecting to the LAN 33, an external network interface 62-2 for connecting to the IP network 30, a network interface 62-3 for connecting to an AS control node 71, a main memory 63, a disk controller 64, and an external memory (hard disk) 65 controlled by the disk controller 64. These elements 62 to 64 are connected to the processor 61 by an internal bus 66.

In the main memory 63, a main control routine 600, a control channel information management table 620, and a subscriber-associated-information processing routine 630 are prepared as pieces of software related to the present invention. These pieces of software are loaded to the main memory 63 from the external memory 65 at the time of starting the subscriber-associated-information processor 60.

Upon receiving a subscriber-associated-information forwarding message from the subscriber-associated-information delivery controller 50 (50A, 50B in FIG. 1) of the MNO network, the main control routine 600 stores the received message in a receiving buffer area defined on the main memory 63 and starts the subscriber-associated-information processing routine 630. The subscriber-associated-information processing routine 630 processes the subscriber associated information indicated in each subscriber-associated-information forwarding message depending on a usage manner of the subscriber associated information in the MVNO network.

FIG. 6 shows an example of the control channel information management table 620. The control channel information management table 620 comprises a plurality of table entries EN101, EN102, . . . , each of which indicates the correspondence between an IP address (laid-open information source GW IP address) 621 indicating a source apparatus of the subscriber associated information and a session ID 523. The control channel information management table 620 is referred to when an ACK signal for the received message is sent back, for example, in the case where the subscriber-associated-information processor 60 communicates with the subscriber-associated-information delivery controller 50 on the MNO side through a control channel to which the TLS protocol is applied.

Next, the function of the subscriber-associated-information delivery controller 50 located in the MNO network will be explained by referring to FIG. 7 to FIG. 10.

In the MNO networks NW-A and NW-B, location information of a wireless terminal 20 is managed by the mobile controller 42 (42A, 42B). In this embodiment, the word "mobile controller" is used as a general term of an entity for managing location information of each wireless terminal. For example, the mobile controller is equivalent to an HLR (Home Location Register) in an HSDPA system of the W-CDMA, and an HSS (Home Subscriber Server) in a 1xEVDO system of the CDMA2000.

According to the present invention, when a specific event to be a trigger of collecting or delivering of the subscriber associated information occurs in communication between the wireless terminal and the MNO network, the access GW 41 or the mobile controller 42 generates an event notification message including an identifier of the wireless terminal and the subscriber associated information, the type of which accords to the event. The event notification message is transmitted to the subscriber-associated-information delivery controller 50.

In this embodiment, it is assumed that the event notification messages to be communicated in the MNO network are generated, for example, at the occurrence of assignment of an IP address to a wireless terminal, registration of wireless terminal location information, or disconnection of a session for the wireless terminal. The IP address to be used by the wireless terminal is assigned, for example, in a DHCP sequence in which the access GW 41 communicates with the DHCP server 40 as shown in FIG. 7(A).

For simplification, FIG. 7(A) shows a part of the DHCP sequence where the access GW 41 receives an assigned IP address notification message from the DHCP server 40 (SQ01), and notifies it to the wireless terminal 20 of the requesting user (SQ02). In this embodiment, the access GW 41 generates, in response to the transmission of the assigned IP address notification or a DHCP ACK message indicating completion of the DHCP sequence to the wireless terminal 20, a notification message of an address assignment event to notify the subscriber-associated-information delivery controller 50 of a user ID and a source IP address of the wireless terminal 20 (SQ03).

A location registration sequence for the wireless terminal 20 is performed at the occurrence of connecting the wireless terminal 20 to the MNO network or handover of the wireless terminal 20 between wireless base stations in the RAN. In the location registration sequence, as shown in FIG. 7(B), for example, when the wireless terminal 20 is connected or handed over to any one of the wireless base stations in the RAN (SQ11), the wireless base station transmits a location registration request message to the mobile controller 42 (SQ12), and the mobile controller 42 sends back a notification of location registration complete to the wireless base station (SQ13). In this embodiment, the mobile controller 42 generates, in response to the return of the notification of location registration complete to the wireless base station, a notification message of a location registration event to notify the subscriber-associated-information delivery controller 50 of the user ID and the location information of the wireless terminal 20 (SQ14).

When the wireless terminal 20 disconnects the session, a session close sequence is performed. In the session close sequence, as shown in FIG. 7(C), for example, in response to a session disconnection request (SQ21) from the wireless terminal 20, the wireless base station in the RAN transmits a connection release request message to the access GW 41 (SQ22), and the access GW 41 sends back to the wireless base station a connection release request permission message for terminating the session (SQ23).

In this embodiment, the access GW 41 generates, in response to the return of the connection release request permission message, a notification message of a session close event to notify the subscriber-associated-information delivery controller 50 of the close of session for the user ID of the wireless terminal 20 (SQ24).

Figure 8:
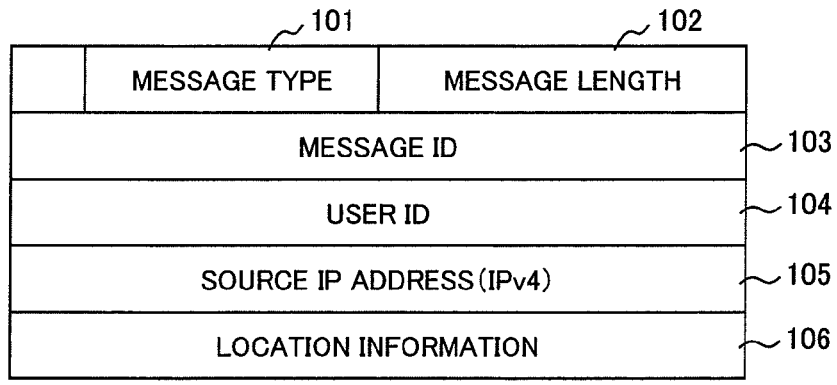
FIG. 8 is a diagram showing an example of a format of event notification message to be transferred in the MNO.
Figure 9:
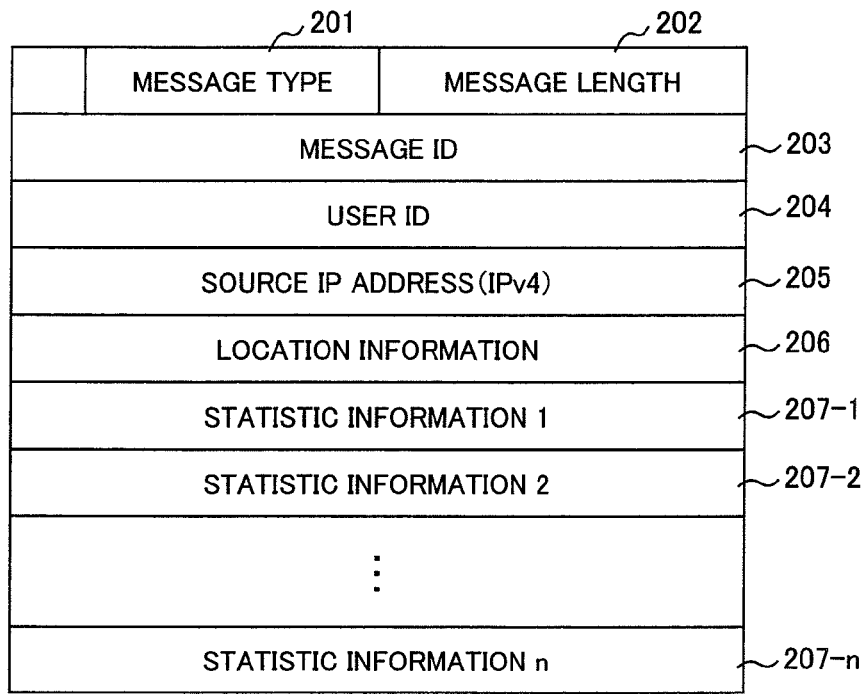
FIG. 9 is a diagram showing an example of a format of a subscriber-associated-information forwarding message to be transmitted from the subscriber-associated-information delivery controller 50 to the subscriber-associated-information processor 60.

FIG. 8 shows an example of a format of the event notification message generated by the access GW 41 or the mobile controller 42 described above.

As the event notification message to be communicated in the MNO network, for example, a format conforming to ASN.1 that is one of data encode standards is applicable. In this embodiment, the event notification message comprises a message type field 101 including a notification type code, a message length field 102, a message ID field 103, a user ID field 104, a source IP address (IPv4) field 105, and a location information field 106.

The notification message of an address-assignment event includes the notification type code, i.e., "101," indicating that this message is an address assignment event notification in the message type field 101, a value of the user ID of the wireless terminal 20 in the user ID field 104, and a value of the IP address assigned to the wireless terminal 20 in the source IP address (IPv4) field 105. In the message ID field 103, a value of a sequence number generated by the access GW 41 at the time of generating the event notification message is set. The location information field 106 of the notification message of address assignment event does not include valid data.

The notification message of a location registration event includes the notification type code, e.g. "102," indicating that this message is the location registration event notification in the message type field 101, a value of the user ID of the wireless terminal 20 in the user ID field 104, a value of the IP address assigned to the wireless terminal 20 in the source IP address (IPv4) field 105, and location information of the wireless terminal 20 in the location information field 106. In the message ID field 103, a value of the sequence number generated by the mobile controller 42 each time the event notification message is generated is set.

The notification message of a session close event includes the notification type code, e.g. "103," indicating that this message is the session close event notification in the message type field 101, a value of the user ID of the wireless terminal 20 in the user ID field 104, and a value of the IP address assigned to the wireless terminal 20 in the source IP address (IPv4) field 105. In the message ID field 103, a value of a sequence number generated by the access GW 41 each time the event notification message is generated is set. The location information field 106 of the session close event notification message does not include valid data.

Figure 10:
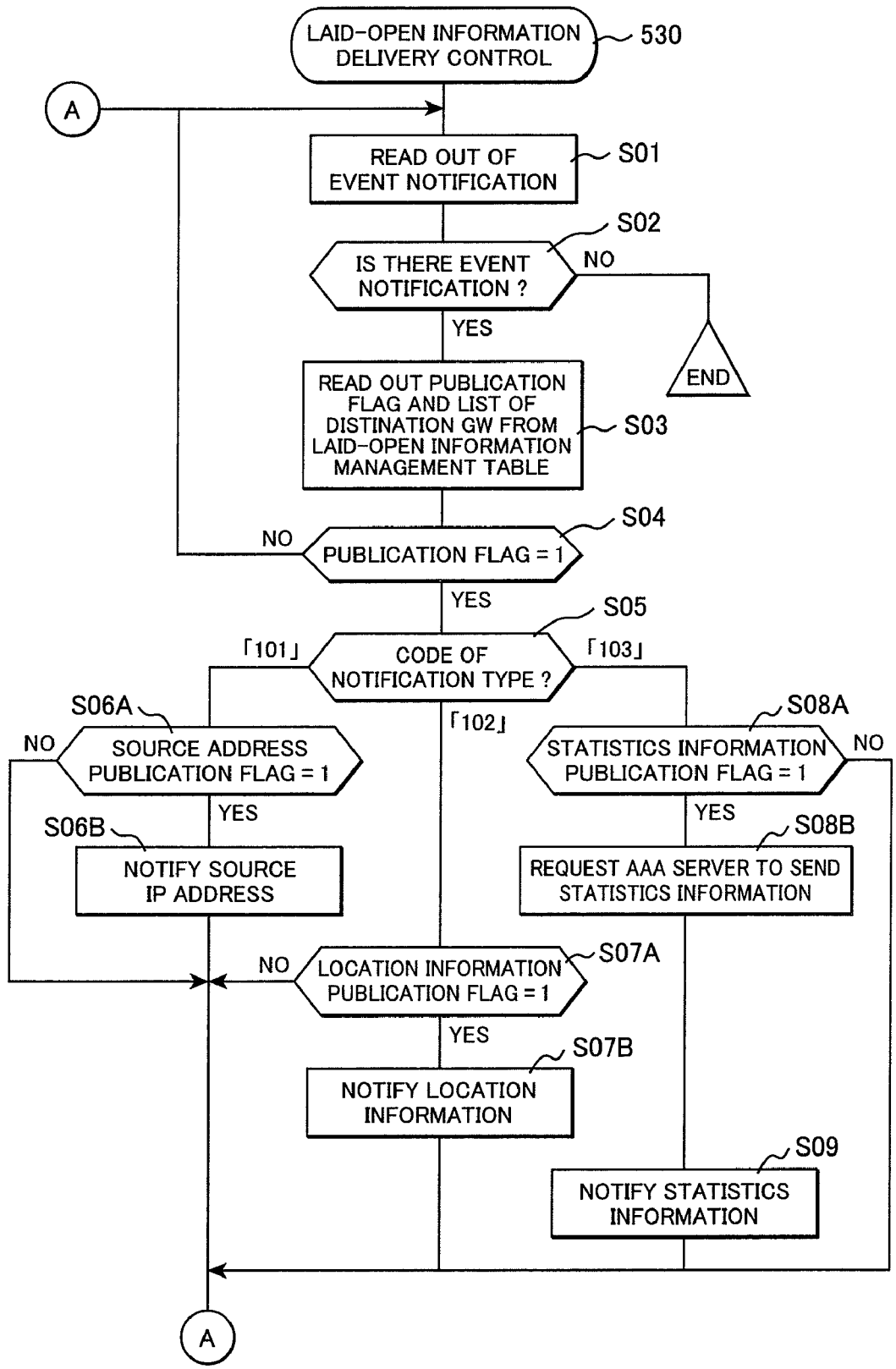
FIG. 10 is a flowchart showing an embodiment of a laid-open information delivery control routine to be performed by the subscriber-associated-information delivery controller 50.

FIG. 10 shows a flowchart of the laid-open information delivery control routine 530 to be executed periodically by the processor 51 of the subscriber-associated-information delivery controller 50.

In the laid-open information delivery control routine 530, the processor 51 reads out a new event notification message from the notification queue 540 in a first in first out (FIFO) manner (Step S01). If the notification queue 540 has no message to be processed, the processor 51 terminates this routine (S02). When the new event notification message can be read out from the notification queue 540, the processor 51 searches the laid-open information management table 510 for a table entry ENj corresponding to a user ID indicated in the user ID field 104 of the received message, and reads out the list of destination GW 512 and the publication flag 513 (513A to 513C) from the entry ENj (S03).

The processor 51 checks the value of the publication flag (S04). If all of the publication flags 513A-513C are set to "0," the processor 51 returns to Step S01 to repeat the operations described above. If any one of the publication flags has been set to "1," the processor 51 checks the value of notification type code indicated by the message type 101 of the received message (S05), and executes processing in accordance with the notification type as follows.

In the case where the value of the notification type code is "101," i.e., the received message is the address assignment event notification, the processor 51 checks the status of the source address publication flag 513A in the table entry ENj (S06A). If the flag 513A is set to "0," the processor 51 returns to Step S01. If the flag 513A is set to "1," the processor 51 generates a subscriber-associated-information forwarding message 200, for example, shown in FIG. 9 to notify the source IP address indicated in the received message to each GW (subscriber-associated-information processor) indicated by the list of destination GW 512 (S06B), and returns to Step S01.

The subscriber-associated-information forwarding message 200 comprises a message type field 201, a message length field 202, a message ID field 203, a user ID field 204, a source IP address field 205, a location information field 206, and a plurality of statistics information fields 207 (207-1 to 207-n) corresponding to statistics items.

The subscriber-associated-information forwarding message 200 generated in Step S06B includes a code indicating that this message is a source IP address notification in its message type field 201, and values of the user ID and the source IP address indicated in the notification message of the address assignment event in its user ID field 204 and its source IP address field 205, respectively. In the message ID field 203, a sequence number generated by the processor 51 each time the subscriber-associated-information forwarding message 200 is generated is set. Neither the location information field 206 nor the statistics information field 207 includes effective data.

In Step S06B, the processor 51 having generated the subscriber-associated-information forwarding message 200 searches the control channel information management table 520 for an IP address of the destination GW (subscriber-associated-information processor) and an session ID based on the GW identifier indicated by the list of destination GW 512, and forwards the subscriber-associated-information forwarding message 200 to the subscriber-associated-information processor 60 on the MVNO network side through a control channel specified by the session ID, using the destination GW IP address as its destination address.

In the case where the value of the notification type code is "102," i.e., the received message is the location registration event notification, the processor 51 checks the status of the location information publication flag 513B in the table entry ENj (S07A). If the location information publication flag is "0," the processor 51 returns to Step S01. If the location information publication flag is "1," the processor 51 generates the subscriber-associated-information forwarding message 200 to notify the location information indicated in the received message to each of the subscriber-associated-information processors indicated by the list of destination GW 512, and returns to Step S01.

The subscriber-associated-information forwarding message 200 generated in Step S07B includes a code indicating that this message is a location information notification in its message type field 201, and a user ID, a source IP address, and location information indicated in the notification message of the location registration event in its user ID field 204, source IP address field 205, and location information field 206, respectively. In the message ID field 203, a sequence number generated by the processor 51 each time the subscriber-associated-information forwarding message 200 is generated is set. The statistics information field 207 does not include valid data.

In the case where the value of the notification type code is "103," namely, the received message is a session close event notification, the processor 51 checks the status of the statistics information publication flag 513C in the table entry ENj (S08A). If the flag is "0," the processor 51 returns to Step S01. If the flag is "1," the processor 51 requests the AAA server 43A to send the statistics information of a user having the user ID indicated in the received message (S08B), and notifies, with a subscriber-associated-information forwarding message 200, the statistics information obtained from the AAA server 43A to each subscriber-associated-information processor indicated by the list of destination GW 512 (S09). After that, the processor 51 returns to Step S01.

The subscriber-associated-information forwarding message 200 generated in Step S09 includes a code indicating that this message is a statistics information notification in its message type field 201, and a user ID, a source IP address, and location information indicated in the notification message of the location registration event in its user ID field 204, source IP address field 205, and location information field 206, respectively. The subscriber-associated-information forwarding message 200 further includes a sequence number generated by the processor 51 each time the subscriber-associated-information forwarding message 200 is generated in its message ID field 203, and statistics information obtained from the AAA server 43A in its statistics information field 207.

The subscriber-associated-information processor 60 of the MVNO network processes the subscriber-associated-information forwarding message 200 received from the subscriber-associated-information delivery controller 50 by executing the subscriber-associated-information processing routine 630. The function of the subscriber-associated-information processing routine 630 differs depending on the usage mode of the subscriber associated information in the MVNO network.

In the case where the MVNO uses the subscriber associated information notified from the MNO network, e.g. statistics information, for the purposes of developing a new application service or improving the current application service, for example, the subscriber-associated-information processing routine 630 may store statistics information extracted from the subscriber-associated-information forwarding message 200 in a statistics file on the hard disk 65 so as to analyze the statistics information in accordance with a request from the system manager, and to output the results of analysis on a display screen of the management terminal 70 in a predetermined display format.

In the case where the MVNO is allowed to reserve the notification (publication) of an IP address from the MNO for a specific user ID indicating one of members of a site so that the MNO network notifies the IP address to the MVNO network when an IP address assignment event occurs, it becomes possible for the MVNO network, by storing the IP address as preferential user information on the MVNO network side, to preferentially process an access request whose source IP address has been stored as the preferential user information in some occasion, for example, when congestion occurs in the MVNO network.

Priority control of access requests may be performed, for example, in such a manner that the subscriber-associated-information processor 60 (subscriber-associated-information processing routine 630) of the MVNO network notifies the AS control node 71 of the correspondence between the user ID and the IP address having been notified from the MNO network, and the AS control node 71 registers the correspondence between the user ID and the IP address in a preferential subscriber information management table, so that only access requests each having a source IP address that has been registered in the preferential subscriber information management table are forwarded preferentially to the application server 72 when access requests are congested at the AS control node. Alternatively, the preferential subscriber information management table may be provided on the application server 72 side, so that the application server 72 can determine whether an access request received in a congestion state is a priority one or a non-priority one by referring to the preferential subscriber information management table, and preferentially process access requests each having a specified source IP address.

The location information of the wireless terminal is applicable to the delivery of local service information from the application server 72 of the MVNO network to each user. It is assumed, for example, such a case where the application server 72 delivers commercial or introductory information of stores or shops in a specific area in the RAN to the wireless terminal. In this case, the subscriber-associated-information processor 60 (subscriber-associated-information processing routine 630) or the AS control node 71 can detect a user of wireless terminal who comes into a predetermined service area, based on the location information of the wireless terminal notified from the MNO network and instruct the application server 72 to start a delivery service of local service information to the user in accordance with the current location of the user.

The users' statistics information becomes effective, for example, when the application server 72 delivers commercial information in accordance with a communication time zone or a communication period of each user. In this case, the subscriber-associated-information processor 60 or the AS control node 71 having been notified of the statistics information from the subscriber-associated-information processor 60 creates a histogram of communication time of each user and notifies the application server 72 of index information that serves as a decision criterion of the service information to be delivered to the user. Alternatively, the statistics information having been laid open as the subscriber associated information may be notified to the application server 72 from the subscriber-associated-information processor 60 through the AS control node 71, so that the application server 72 can analyze the information in accordance with the kind of information service provided by the application server 72.

In the above embodiment, the subscriber-associated-information delivery controller located in the MNO network stores, in association with the user ID applied from the MVNO in the laid-open information management table 510, publication flags indicating the kind of information to be delivered to the subscriber-associated-information processor belonging to the MVNO network. However, in the case where the MVNO wishes delivery of, for example, the source IP address and the location information for unspecified users, it may be configured that a table entry specifying the list of destination GW and publication flags is prepared in the laid-open information management table 510 in association with a default value meaning an unspecified user ID, so that the subscriber associated information according to the publication flags is delivered to the MVNO network, irrespective of the user ID.

The laid-open information management table 510 may have such a simpler configuration as that the list of destination GW is indicated in association with the event type or the publication flags. In this case, the subscriber-associated-information delivery controller 50 becomes able to specify the delivery destination of the subscriber associated information from the laid-open information management table 510 by using the type code of the received event notification message as a search key, irrespective of the user ID, and to deliver the subscriber associated information of the kind that the MVNO desires to the subscriber-associated-information processor 60 of the MVNO network. Further, in the case where the subscriber-associated-information processor 60 filters the subscriber associated information received from the MNO network according to the user ID table, the application server is able to perform the priority control of the aforementioned access request.

Although three kinds of subscriber associated information, i.e., the source IP address, the location information, and the statistics information of the wireless terminal were collected in the MNO network shown in the embodiment, the present invention makes it possible for the subscriber-associated-information delivery controller 50 to deliver much more kinds of subscriber associated information to the MVNO network by increasing the types of the event notification messages generated in the MNO network.

What is claimed is:

1. A packet communication network comprising a mobile network operator (MNO) network, which includes a radio access network for communicating with wireless terminals, and a mobile virtual network operator (MVNO) network including an application server for providing information services to the wireless terminals via the MNO network, wherein said MNO network includes a gateway apparatus for connecting said access network to a core network, a mobile controller, and a subscriber-associated-information delivery controller for receiving subscriber associated information of each wireless terminal being connected to the radio access network from at least one of said gateway apparatus and said mobile controller, generating an information forwarding message including the subscriber associated information and delivering the subscriber associated information to said MVNO network through said core network by means of said information forwarding message, wherein said MVNO network includes a subscriber-associated-information processor for receiving the information forwarding message from the subscriber-associated-information delivery controller through said core network and storing the subscriber associated information extracted from the received information forwarding message, thereby collecting subscriber associated information of wireless terminals including wireless terminals that did not access the application server, for use in the MVNO network, and wherein said subscriber-associated-information delivery controller has a laid-open information management table for indicating the correspondence of the subscriber-associated-information processor of said MVNO network and the kind of the subscriber associated information to be delivered, and generates said information forwarding message to selectively deliver the subscriber associated information of each wireless terminal to said subscriber-associated-information processor according to the laid-open information management table.

2. The packet communication network according to claim 1, wherein at least one of said gateway apparatus and said mobile controller transmits, in response to a predetermined event occurred in a communication sequence performed with each of said wireless terminals, an event notification message including subscriber associated information of the wireless terminal to said subscriber-associated-information delivery controller, and wherein said subscriber-associated-information delivery controller selectively delivers the subscriber associated information indicated in the event notification message to the subscriber-associated-information processor of said MVNO network by means of said information forwarding message.

3. The packet communication network according to claim 2, wherein said MNO network includes a management server for managing statistics information for each user of said wireless terminals, and wherein said subscriber-associated-information delivery controller obtains, in response to a specific event notification message indicating session close received from one of said gateway apparatus and said mobile controller, statistics information corresponding to a user identifier indicated in the specific event notification message from the management server, and delivers the statistics information to the subscriber-associated-information processor of said MVNO network as the subscriber associated information by means of said information forwarding message.

4. The packet communication network according to claim 1,
wherein said subscriber-associated-information delivery controller has a channel information management table for indicating the correspondence between an identifier of said subscriber-associated-information processor and a session identifier, and delivers said subscriber associated information to said subscriber-associated-information processor through a control channel having the session identifier.

5. The packet communication network according to claim 1,
wherein said application server controls information services for said wireless terminals based on the subscriber associated information received from said subscriber-associated-information processor.

6. A subscriber-associated-information delivery controller that belongs to a mobile network operator (MNO) network including a radio access network for communicating with wireless terminals, a gateway apparatus for connecting said radio access network to a core network, and a mobile controller and delivers subscriber associated information of each wireless terminal to at least one of a plurality of mobile virtual network operator (MVNO) networks each including an application server for providing information services to said wireless terminals through said core network and said MNO network, the subscriber-associated-information delivery controller comprising:
an internal network interface for receiving event notification messages each including subscriber associated information of one of said wireless terminals from at least one of said gateway apparatus and said mobile controller;
an external network interface for connecting with said the core network;
a controller; and
a laid-open information management table for indicating the correspondence between at least one identifier of a subscriber-associated-information processor belonging to each of said MVNO networks and the kind of subscriber associated information to be delivered;
wherein said controller is configured so as to generate an information forwarding message including the subscriber associated information extracted from the event notification message and selectively transmit the information forwarding message to said subscriber-associated-information processor of one of said MVNO network, in accordance with said laid-open information management table, thereby to enable the subscriber-associated-information processor to collect subscriber associated information of wireless terminals including wireless terminals that did not access the application server of the MVNO network.

7. The subscriber-associated-information delivery controller according to claim 6, further comprising:
a channel information management table for indicating the correspondence between an identifier of each of said subscriber-associated-information processors and a session identifier,
wherein said controller transmits said information forwarding message including the subscriber associated information to said subscriber-associated-information processor through a control channel which is formed on said core network and assigned said session identifier.

8. The subscriber-associated-information delivery controller according to claim 6,
wherein said laid-open information management table comprises a plurality of table entries each of which indicates, in association with an user identifier of each of said wireless terminals, the identifier of said subscriber-associated-information processor to be the destination of said information forwarding message and the kind of subscriber associated information to be delivered,
wherein said internal network interface receives an event notification message including an user identifier and subscriber associated information from one of said gateway apparatus and said mobile controller, and
wherein said controller searches said laid-open information management table for a table entry corresponding to the user identifier indicated in the received event notification message, and selectively transmits said information forwarding message including the subscriber associated information extracted from the received event notification message to the subscriber-associated-information processor of one of said MVNO networks according to the searched table entry.

9. The subscriber-associated-information delivery controller according to claim 7,
wherein said laid-open information management table comprises a plurality of table entries each of which indicates, in association with an user identifier of each of said wireless terminals, the identifier of said subscriber-associated-information processor to be the destination of said information forwarding message and the kind of subscriber associated information to be delivered,
wherein said internal network interface receives an event notification message including an user identifier and subscriber associated information from one of said gateway apparatus and said mobile controller, and
wherein said controller searches said laid-open information management table for a table entry corresponding to the user identifier indicated in the received event notification message, and selectively transmits said information forwarding message including the subscriber associated information extracted from the received event notification message to the subscriber-associated-information processor of one of said MVNO networks according to the searched table entry.

10. The subscriber-associated-information delivery controller according to claim 6,
wherein said laid-open information management table includes a plurality of publication flags corresponding to different kinds of subscriber associated information, each of the publication flags indicating whether the corresponding kind of subscriber associated information is allowed to be laid open to the subscriber-associated-information processor specified by the identifier, and
wherein said controller is configured so as to refer to the laid-open information management table and generate said information forwarding message including the subscriber associated information corresponding to the publication flag which allows laid open of the subscriber associated information.

* * * * *